United States Patent [19]

Watanabe et al.

[11] Patent Number: 4,614,771
[45] Date of Patent: Sep. 30, 1986

[54] PROCESS FOR MAKING DIENE COPOLYMER RUBBERS

[75] Inventors: Hiroyuki Watanabe, Yokohama; Kohkichi Noguchi, Kamakura; Toshio Kase, Tokyo; Shuichi Akita, Kamakura, all of Japan

[73] Assignee: Nippon Zeon Co., Ltd., Tokyo, Japan

[21] Appl. No.: 790,167

[22] Filed: Oct. 22, 1985

[30] Foreign Application Priority Data

Oct. 26, 1984 [JP] Japan ................................. 59-225493

[51] Int. Cl.$^4$ ............................................... C08F 8/00
[52] U.S. Cl. .................................. 525/351; 525/332.7; 525/332.9; 525/333.1; 525/333.2; 525/374
[58] Field of Search ............... 525/332.7, 332.9, 333.1, 525/333.2, 374, 351, 370, 371

[56] References Cited

U.S. PATENT DOCUMENTS

| | | | |
|---|---|---|---|
| 3,468,972 | 9/1969 | Hsieh | 525/333.2 |
| 3,985,830 | 10/1976 | Fetters | 525/332.9 |
| 4,301,258 | 11/1981 | Lal | 525/333.1 |
| 4,301,259 | 11/1981 | Lal | 525/333.1 |
| 4,304,886 | 12/1981 | Bean | 525/333.1 |

*Primary Examiner*—Paul R. Michl
*Attorney, Agent, or Firm*—Sherman and Shalloway

[57] ABSTRACT

A process for making a diene copolymer rubber having improved rebound, which comprises polymerizing a conjugated diene monomer with an aromatic vinyl monomer in a hydrocarbon solvent in the presence of an alkali metal and/or alkaline earth metal initiator, to form a dienyl-metal terminated, conjugated diene-aromatic vinyl copolymer rubber, and thereafter reacting the copolymer rubber with at least one reactant selected from the group consisting of aminoaldehydes, aminoketones, aminothioaldehydes and aminothioketones.

7 Claims, No Drawings

PROCESS FOR MAKING DIENE COPOLYMER RUBBERS

This invention relates to a process for making diene copolymer rubbers having improved rebound. More particularly the invention relates to a process for making diene copolymer rubbers which comprises reacting active diene copolymer rubbers having dienyl-metal terminals with specific amino compounds.

Recently the demand for a rubber material for tire tread of autombobiles, which has a low rolling resistance and a high wet skid resistance is very strong, to meet the requirements for reducing the fuel cost and improving running safety of automobiles. In order for reducing the rolling resistance, the rebound of the rubber material must be increased. However, those two properties are incompatible, and various proposals have been made to improve the polymers to bring about the favorable balance between the two properties. For example, there have been proposed a method in which the vinyl content and styrene content of a styrene-butadiene copolymer are adjusted to a specific ratio (Japanese Laid-open Patent Publication No. 62248/1979), a method in which specific styrene chain distribution is given to such a copolymer (Japanese Laid-open Patent Publication No. 143209/1981), a method in which specific vinyl linkage chain distribution is given to such a copolymer (Japanese Laid-open Patent Publication No. 149413/1981), and a method of introducing butadienyl-tin bond into the main chain of such a copolymer by coupling reaction (Japanese Laid-open Patent Publication No. 87407/1982).

An object of the present invention is to develop a rubber material which exhibits excellently balanced rolling resistance (rebound) and wet skid resistance, by a method other than those above-mentioned.

With the view to accomplish the above object, the present inventors measured physical properties of vulcanizates of the hydroxyl-terminated SBR (styrenebutadiene copolymer rubbers) disclosed in U.S. Pat. No. 3,109,871 which are obtained by reacting alkali metal-terminated polymers with N,N-disubstituted aminoketones, and also those of the vulcanizates of mercaptanterminated SBR disclosed in U.S. Pat. No. 3,755,269 which are obtained by reacting metal-terminated polymers with aromatic thioketones, to discover that the vulcanizates of such functional group-terminated SBR's exhibit markedly improved rebound over the vulcanizates of SBR's containing no functional groups bonded at the terminals of their polymer chains.

The present inventors made various studies for improving the method for introducing above specific atomic groups, in the attempt to develop copolymers of conjugated diene monomers and aromatic vinyl monomers having further improved rebound, and as the result discovered that by reacting the dienyl-alkali metal and/or alkaline earth metal-terminated copolymers with specific compounds, diene copolymer rubbers exhibiting excellently balanced rolling resistance (rebound) and wet skid resistance can be obtained. Whereupon the present invention was completed.

Thus, according to the present invention, a process for making a diene copolymer rubber is provided, which comprises polymerizing a conjugated diene monomer with an aromatic vinyl monomer in a hydrocarbon solvent in the presence of an alkali metal and/or alkaline earth metal initiator, to form a dienyl- metal-terminated, conjugated diene-aromatic vinyl copolymer rubber, and thereafter reacting said copolymer rubber with at least one compound selected from aminoaldehydes, aminothioaldehydes, aminoketones and aminothioketones (hereinafter the "reactant").

The characteristics of the present invention resides in that first a dienyl- metal-terminated, conjugated diene-aromatic vinyl copolymer rubber is formed, and then it is reacted with the specific reactant. As the consequence, the product's rebound is markedly improved over that of the similar polymer having aromatic vinyl-metal terminals.

Generally when a conjugated diene monomer and aromatic vinyl monomer are copolymerized in a hydrocarbon solvent in the presence of an organic alkali metal initiator, the former exhibits definitely higher copolymerization reactivity than the latter. For example, it is described in M. Morton, J. Polym. Sci., vol. 61, 25 (1962) that in benzene solvent, $r_1$ (butadiene)=4.5 and $r_2$ (styrene)=0.08−0.41. Such significant differences in the copolymerization reactivity causes the conjugated diene monomer to be consumed during the earlier half of the polymerization period, and therefore more of the aromatic vinyl monomer remains in the system at the final stage of polymerization to increase the active aromatic vinyl-alkali metal terminals. This is also apparent from the phenomenon observed during the polymerization of butadiene and styrene in a hydrocarbon solvent in the presence of n-butyllithium catalyst, i.e., when the conversion is yet low, the color of polymerization system is light yellow characteristic to butadienyl anions, but as the conversion rises and the butadiene is substantially consumed to leave in the system mostly styrene, the color of the system changes to reddish orange characteristic to styryl anions, and also the rate of polymerization increases.

In the dienyl- metal-terminated, conjugated diene-aromatic vinyl copolymer rubber of this invention, the monomer units adjacent to said terminal groups may be either conjugated diene or aromatic vinyl. Also the method of rendering the copolymer rubber dienyl- metal-terminated is not particularly limited as long as the terminals of polymer chains can be made dienes. For example, a method of adding conjugated diene to the system after completion of the copolymerization (normally the addition of at least equivalent amount of conjugated diene monomer to the active metal terminals being sufficient, preferably about 10-100 molar times that of the active terminals is used), or a method of carrying out the copolymerization in a polymerization reactor equipped with a reflux condenser can be employed.

Examples of conjugated diene monomers useful in the present invention include 1,3-butadiene, isoprene, 1,3-pentadiene, 2,3-dimethyl-1,3-butadiene and 1,3-hexadiene, etc., and aromatic vinyl monomers include slyrene, α-methylstyrene, p-methylstyrene, vinyltoluene and vinylnaphthalene.

The conjugated diene monomer and aromatic vinyl monomer are normally used at the weight ratios of 95-50:5-50, preferably 95-65:5-35.

The copolymer rubbers having the dienyl-alkali metal and/or alkaline earth metal terminals to be used in this invention can be obtained by polymerizing conjugated diene monomers with aromatic vinyl monomers, in the presence of alkali metal initiators (e.g., those disclosed in Japanese Patent Application, Publication No. 4996/69) or of alkaline earth metal catalysts composed chiefly of such compounds as barium, strontium, calcium or the like, which are normally employed for solution polymerization.

As the alkali metal initiators useful for the present invention, the most typical are organolithium initiators such as methyllithium, ethyllithium, n-propyllithium, i-propyllithium, n-butyllithium, secbutyllithium, t-butyllithium, octyllithium, n-decyllithium, phenyllithium, 2-naphthyllithium, 2-butylphenyllithium, 4-phenyl-butyllithium, cyclohexyllithium, 4-cyclopentyllithium, 1,4-dilithio-butene-2, etc., but the initiators are not limited to the above. As the alkaline earth metal initiators, for example, (1) the complexes composed of Ba-tertiary alkoxide/dibutyl Mg, disclosed in Japanese Laid-open Patent Publication No. 48910/77, (2) the complexes composed of organic Li and

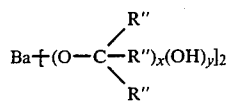

[in which at least one of R"s stands for methyl or cyclohexyl group, the rest of R"(s) standing for $C_1-C_6$ alkyl group(s), and x:y=99.5-88:0.5-12 (mol ratio)], disclosed in Japanese Laid-open Patent Publication No. 9090/77, (3) the composite initiators composed of an alcoholate or phenolate of Ba or Mg/organic Li or organic Al, disclosed in Japanese Laid-open Patent Publication No. 112916/81, and (4) those disclosed in Japanese Laid-open Patent Publication Nos. 17591/77, 30543/77, 98077/77, 112916/81, 98077/82, etc. may be used.

The amount of the initiator to be used is normally within the range of 0.2-20 millimoles per 100 g of the monomers.

Together with the said metal initiator, a polar compound such as an ether compound, amine compound, phosphine compound or the like may be used as the randomizer or for the purpose of controlling the vinyl content in the conjugated diene monomer units.

The hydrocarbon solvent useful for the present invention may be any of aliphatic, aromatic or alicyclic hydrocarbons, including, for example, propane, n-butane, i-butane, n-pentane, i-pentane, n-hexane, cyclohexane, propene, 1-butene, i-butene, trans-2-butene, cis-2-butene, 1-pentene, 2-pentene, 1-hexene, 2-hexene, benzene, toluene, xylene, and ethylbenzene. Those are preferred examples. More than one of such hydrocarbons may be mixed to serve as the solvent. The ratio of the monomers to the solvent is determined according to the viscosity of polymer solution, and agitation power and heat-removing capacity of the polymerization reactor. Generally it is 1:10 to 1:1, by weight.

Polymerization temperature normally ranges $-20°$ C.-$150°$ C., preferably $40°-120°$ C. The polymerization is practiceable either under rising temperatures or under a constant temperature.

The reactants useful in the present invention, i.e., aminoaldehydes, aminoketones, aminothioaldehydes and aminothioketones are aromatic or aliphatic. When aromatic, they should have 1 to 4 amino groups per aromatic ring. The amino group is that represented by the general formula

in which R and R' may be same or different, and are selected from hydrogen and such substituent groups as $C_1-C_{12}$ alkyl groups, cycloalkyl groups, aryl groups, aralkyl groups and alkoxyalkylene groups. When di-substituted, the substituent groups may be same or different. The aromatic ring may contain up to four substituent groups other than above amino groups.

Examples of aromatic reactants include 4,4'-diaminobenzophenone, 4,4'-bis(dimethylamino)-benzophenone, 4,4'-bis(diethylamino)-benzophenone, 3-diethylaminobenzophenone, 3,3',5,5'-tetra(-dinonylamino)benzophenone, aminoanthraquinone, N,N-dimethylaminoanthraquinone, 1,4-diaminoanthraquinone, 1,4-N,N-dimethyldiaminoanthraquinone, 1,4-N,N,N',N'-tetramethyldiaminoanthraquinone, phenoxazine, N-methylphenoxazine, 10-butylphenoxazine, 3,7-diamino-10-acetylphenoxazine, acrydone, N-methylacrydone, 4-aminobenzaldehyde, 4-dimethylaminobenzaldehyde, 3,5-bis(dihexylamino)benzaldehyde, 2,4,6-tris(diethylamino)-benzaldehyde, 4-dicyclopentylaminobenzaldehyde, 4,5-bis(diethylamino)-1-naphthaldehyde, and the corresponding thioketones and thioaldehydes.

As the aliphatic reactants may be named for example are 3-dimethylaminopropionaldehyde, 3-diethylaminopropionaldehyde, 2-dimethylaminoacetaldehyde, dimethylaminopivalaldehyde, 1,5-bis(di-n-propylamino)-3-pentanone, 5-dodecylamino-n-heptaldehyde, 1,3-bis(-diheptylamino)-2-propanone, 1,7-bis(methylethylamino)-4-heptanone, and the corresponding thioaldehydes and thioketones.

Particularly preferred reactants are N,N-disubstituted amino compounds.

The amount of use of the reactant is selected within the range of 0.5-1.0 mol per mol of the active dienyl-metal-terminated diene copolymer rubber. When it is less than 0.5 mol, the improvement in rebound is insufficient. Whereas, use of more than 1.0 mol does not bring about the corresponding improvement in the rebound. The reaction temperature and time are variable over wide ranges, but generally the former ranges from room temperature to $100°$ C., and the latter, from several seconds to several hours.

After termination of the reaction, the modified diene polymer rubber is coagulated from the reaction system. The coagulation is effected by the methods ordinarily practiced in the production of rubber by solution polymerization, such as the addition of a coagulating agent such as alcohol e.g., methanol or ethanol) to the reaction system, or steam stripping. The coagulation temperature neither is limited. The crumbs separated from the reaction system can be dried with the devices conventionally employed in production of synthetic rubber, such as a band dryer, extrusion-type dryer, etc. The drying temperature is subject to no specific limitation.

Thus obtained diene polymer rubber is excellent in the balance of rebound and wet skid resistance, and hence is useful as a rubber material for tire treads.

Hereinafter the present invention will be more specifically explained with reference to working examples.

EXAMPLE 1

(1) A 2-liter stainless steel polymerization reactor was washed and dried, and its inside air was substituted with dry nitrogen. Thereafter the reactor was charged with 120 g of 1,3-butadiene, 40 g of styrene, 840 g of cyclohexane, 0.4 millimole of tetramethylethylenediamine and 1.0 millimole of n-butyllithium (n-hexane solution). The polymerization was performed at 45° C. for 5 hours under stirring of the content. Thereafter 50 g of a liquid butadiene-cyclohexane mixture containing 1% by weight of butadiene was added to the system, followed by 15 minute's reaction at 45° C. Then 1 millimole of the reactant as specified in Table 1 was added, and the addition reaction was performed for 30 minutes. Whereupon the reaction was terminated by the addition of 5 ml of methanol, and the polymer solution was poured into a 1.5 weight percent methanol solution of 2,6-di-t-butyl-p-cresol (BHT) to coagulate the formed copolymer rubber, which was dried under reduced pressure at 60° C. for 24 hours to provide the rubber samples No. A through No. J.

(2) Also rubber samples No. K through No. M were obtained through the same procedures as in (1) above, except that the addition of butadiene after termination of the butadiene-styrene copolymerization reaction was omitted and the reactants specified in Table 1 were immediately added to the respective systems.

The vinyl contents and styrene contents of thus obtained copolymer rubbers were determined by infrared spectroscopy [Hampton, Anal. Chem., 21, 923 (1949)]. The analysis results and Mooney viscosities of the copolymer rubbers are also shown in Table 1.

TABLE 1

| Rubber No. | | Reactant Compound | Amount added (millimole) | Amount of later-added butadiene (g) | Vinyl content (%) | Styrene Content (%) | Mooney viscosity |
|---|---|---|---|---|---|---|---|
| Examples of this invention | A | 4,4'-bis(dimethylamino)benzophenone | 1.0 | 5 | 42.3 | 25.1 | 38 |
| | B | 4,4'-bis(dimethylamino)thiobenzophenone | 1.0 | 5 | 42.0 | 25.1 | 37 |
| | C | 4,4'-bis(diethylamino)benzophenone | 1.0 | 5 | 42.0 | 24.8 | 41 |
| | D | 4,4'-diaminobenzophenone | 1.0 | 5 | 43.1 | 24.6 | 40 |
| | E | 4-dimethylaminobenzaldehyde | 1.0 | 5 | 43.3 | 25.3 | 38 |
| | F | 3,5-bis(diethylamino)benzaldehyde | 1.0 | 5 | 42.4 | 25.0 | 39 |
| | G | 4-diethylaminobenzophenone | 1.0 | 5 | 42.4 | 25.1 | 41 |
| | H | 4-dimethylaminobenzthioaldehyde | 1.0 | 5 | 42.0 | 24.9 | 40 |
| | I | dimethylaminopivalaldehyde | 1.0 | 5 | 42.3 | 25.0 | 38 |
| | J | 1,5-bis(di-n-propylamino)-3-pentanone | 1.0 | 5 | 42.0 | 24.89 | 39 |
| Control examples | K | 4,4'-bis(dimethylamino)benzophenone | 1.0 | 0 | 42.7 | 24.9 | 43 |
| | L | 4,4'-bis(dimethylamino)thiobenzophenone | 1.0 | 0 | 43.0 | 25.0 | 39 |
| | M | — | | 0 | 42.4 | 24.7 | 39 |

Those copolymer rubbers were kneaded in a 250 ml. Bravender-type mixer following the compounding recipe of Table 2, to provide rubber compositions, which were press-cured at 160° C. for 25 minutes to provide test specimens. The rebound of vulcanized rubbers was measured at 50° C. using Dunlop tripsometer. Wet skid resistance was measured at 23° C., with a portable skid tester made by Stanley Co., on the road surface (ASTM E-303-74, outside type B, black, safety walk made by MMM Co.). The results are shown in Table 3.

TABLE 2

| Compounding Recipe | |
|---|---|
| Polymer rubber | 100 parts by weight |
| Zinc oxide No. 3 | 3 " |
| Stearic acid | 2 " |
| Sulfur | 1.75 " |
| N—cyclohexyl-2-benzothiazole sulphenamide | 1.1 " |
| HAF carbon black | 50 " |
| Aromatic process oil | 5 " |

TABLE 3

| Rubber No. | | Rebound (%) | West Skid Resistance |
|---|---|---|---|
| Examples of this Invention | A | 68 | 77 |
| | B | 68 | 77 |
| | C | 68 | 77 |
| | D | 66 | 76 |
| | E | 66 | 77 |
| | F | 67 | 76 |
| | G | 67 | 77 |
| | H | 67 | 77 |
| | I | 67 | 77 |
| | J | 67 | 77 |
| Control Examples | K | 63 | 77 |
| | L | 63 | 77 |
| | M | 56 | 77 |

From the results of Table 3, it could be understood that the vulcanizates of butadiene-styrene copolymer rubbers obtained through the present process show very high rebound, and the tires using the same rubbers at the treads excel in the balance of rolling resistance and wet skid resistance.

EXAMPLE 2

(1) The copolymerization and the polymerization with later added butadiene were performed under identical conditions with those of Example 1-(1), except that the feed amounts of butadiene and styrene were changed to those specified in Table 4. Thereafter 1.0 millimole of 4,4'-bis(dimethylamino)benzophenone was added, followed by the procedures same to those of Example 1-(1), to provide rubber samples No. N and No. O.

(2) The procedures under the conditions identical with above (1) were repeated except that the amount of tetramethylethylenediamine was changed to that indicated in Table 4, to provide rubber samples No. P and No. Q.

Those copolymer rubbers were formulated into the compositions following the same compounding recipe as given in Example 1, and the resulting vulcanizates were measured of their rebound and wet skid resistance. The results were as shown in Table 5.

TABLE 4

| Rubber No. | | Tetramethyl-ethylenediamine (millimole) | Styrene (g) | Butadiene (g) | Vinyl Content (%) | Styrene Content (%) | Mooney Viscosity |
|---|---|---|---|---|---|---|---|
| Examples | N | 0.4 | 16 | 144 | 44.5 | 10.1 | 38 |
| of this | O | 0.4 | 48 | 112 | 41.2 | 30.2 | 37 |
| Invention | P | 1.0 | 40 | 120 | 80.0 | 25.0 | 40 |
| | Q | 0.2 | 40 | 120 | 25.0 | 24.9 | 38 |

TABLE 5

| Rubber No. | | Rebound (%) | West Skid Resistance |
|---|---|---|---|
| Examples | N | 70 | 70 |
| of this | O | 66 | 79 |
| Invention | P | 64 | 85 |
| | Q | 70 | 74 |

EXAMPLE 3

A 50-liter polymerization reactor equipped with a reflux condenser was washed and dried, substituted with dry nitrogen, and charged with 2.4 kg of 1,3-butadiene, 0.8 kg of styrene, 12.8 kg of cyclohexane, 4.0 kg of n-butane and 8 millimoles of tetramethylethylenediamine. The mixture was given a temperature of 45° C., and to which 20 millimoles of n-butyllithium (n-hexane solution) was added. The polymerization temperature was controlled at 45° C., with the latent heat of evaporation of 1,3-butadiene and n-butane. The evaporated 1,3-butadiene and n-butane were condensed at the ammonia-cooled condenser installed at the upper part of the reactor and recirculated into the reactor. After 5 hours' polymerization, 100% conversion was confirmed. Whereupon 20 millimoles of 4,4'-bis(dimethylamino)benzophenone was added, followed by 30 minutes' reaction at 45° C. under stirring. Thereafter 300 ml of methanol containing 64 g of 2,6-di-t-butyl-p-cresol (BHT) was added to stop the reaction. Thus formed copolymer solution was removed of the solvent by steam stripping, and the resulting coagulated rubber was rolled into a sheet, which was hot air-dried at 60° C. for 24 hours.

The properties of the formed copolymer and the rebound and wet skid resistance of the vulcanized rubber prepared therefrom, measured as in Example 1, were as follows:

| | |
|---|---|
| Vinyl content | 42.3% |
| Styrene content | 25.3% |
| Mooney viscosity | 40 |
| Rebound | 68 |
| Wet skid resistance | 77 |

When a polymerization reactor equipped with a reflux condenser was used, dienyl-lithium was formed without the additional supply of 1,3-butadiene after completion of the polymerization reaction, and consequently the rebound-improving effect achieved by the addition of 4,4'-bis(dimethylamino)benzophenone was recognizable.

The formation of dienyl-lithium could be inferred from the observation that the color of the copolymer solution after completion of the polymerization reaction was still light yellow characteristic to butadienyl anions, not the orange color characteristic to styryl anions.

EXAMPLE 4

The same polymerization reactor employed in Example 3 was charged with 14.4 kg of n-hexane, 2.92 g of butadiene and 0.68 kg of styrene, and the system was heated to 70° C. under stirring. Then the polymerization was initiated by addition of 13.6 millimoles of barium dinonyl phenoxide, 20 millimoles of lithium-magnesium tributyl and 26.8 millimoles of triethylaluminum, and the reaction was continued for 2 hours. The maximum temperature of the polymerization system reached 85° C. Then 30 millimoles of 4,4'-bis(dimethylamino)benzophenone was added to the polymerization system and reacted for 30 minutes. Thus formed copolymer was recovered in the manner similar to Example 3 (rubber sample No. R).

Another copolymer was prepared under idential conditions with above, except no reflux condenser was used (rubber sample No. S).

The properties of the formed copolymers and the rebound and wet skid resistance of the vulcanized rubbers prepared therefrom, measured as in Example 1, were as in Tables 6 and 7 below, respectively.

TABLE 6

| Rubber No. | Mooney viscosity | Styrene content (%) | Vinyl content (%) | Trans-1,4 content (%) | Cis-1,4 content (%) |
|---|---|---|---|---|---|
| R | 47 | 15.1 | 4.2 | 79.6 | 16.2 |
| S (*) | 45 | 14.8 | 4.0 | 80.0 | 16.0 |

TABLE 7

| Rubber No. | Rebound (%) | Wet skid resistance |
|---|---|---|
| R | 73 | 65 |
| S (*) | 70 | 65 |

Note:
(*) Control

What we claim is:

1. A process for making a diene copolymer rubber having improved rebound, which comprises polymerizing a conjugated diene monomer and an aromatic vinyl monomer in a hydrocarbon solvent in the presence of an alkali metal and/or alkaline earth metal initiator, to form a dienyl-metal terminated, conjugated diene-aromatic vinyl copolymer rubber, and thereafter reacting the copolymer rubber with at least one reactant selected from the group consisting of aminoaldehydes, aminoketones, aminothioaldehydes and aminothioketones.

2. The process of claim 1, in which the conjugated diene monomer and aromatic vinyl monomer are used at the weight ratios ranging from 95-50:5-50.

3. The process of claim 1, in which the monomers and the hydrocarbon solvent are used at the weight ratios ranging from 1:10-1:1.

4. The process of claim 1, in which the conjugated diene-aromatic vinyl copolymer rubber is reacted with 0.5-1.0 mole of the reactant per mole of said copolymer rubber.

5. The process of claim 1 wherein said at least one reactant includes at least one amino group of the formula —NRR' in which R and R' may be the same or different and are selected from the group consisting of hydrogen, $C_1$-$C_{12}$ alkyl, cycloalkyl, aryl, aralkyl, and alkoxy alkylene.

6. The process of claim 1 wherein the at least one reactant is an aromatic amino group containing reactant selected from the group consisting of 4,4'-diaminobenzophenone, 4,4'-bis(dimethylamino)-benzophenone, 4,4'-bis(diethylamino)benzophenone, 3-diethylaminobenzophenone, 3,3', 5,5'-tetra(dinonylamino)-benzophenone, aminoanthraquinone, N,N-dimethylaminoanthraquinone, 1,4-diaminoanthraquinone, 1,4-N,N-dimethyldiaminoanthraquinone, 1,4-N,N,N',N'-tetramethyldiaminoanthraqunone, phenoxazine, N-methylphenoxazine, 10-butylphenoxazine, 3,7-diamino-10-acetylphenoxazine, acrydone, N-methylacrydone, 4-aminobenzaldehyde, 4-dimethylaminobenzaldehyde, 3,5-bis(dihexylamino)benzaldehyde, 2,4,6-tris(diethylamino)-benzaldehyde, 4-dicyclopentylaminobenzaldehyde, 4,5-bis(diethylamino)-1-naphthaldehyde and the corresponding thioketones and thioaldehydes.

7. The process of claim 1 wherein the at least one reactant is an aliphatic amino-containing compound selected from the group consisting of 3-dimethylaminopropionaldehyde, 3-diethylaminopropionaldehyde, 2-dimethylaminoacetaldehyde, dimethylaminopivalaldehyde, 1,5-bis(di-n-propylamino)-3-pentanone, 5-dodecylamino-n-heptaldehyde, 1,3-bis(dihepthlamino)-2-propanone, 1,7-bis(methylethylamino)-4-heptanone, and the corresponding thioaldehydes and thioketones.

* * * * *